(12) United States Patent
Kneckt et al.

(10) Patent No.: US 7,729,236 B2
(45) Date of Patent: Jun. 1, 2010

(54) USE OF TIMING INFORMATION FOR HANDLING AGGREGATED FRAMES IN A WIRELESS NETWORK

(75) Inventors: Jarkko Lauri Sakari Kneckt, Espoo (FI); Naveen Kakani, Irving, TX (US); Svetlana Mikhailova, Helsinki (FI)

(73) Assignee: Nokia Corporation, Espoo (FI)

( * ) Notice: Subject to any disclaimer, the term of this patent is extended or adjusted under 35 U.S.C. 154(b) by 894 days.

(21) Appl. No.: 11/272,523

(22) Filed: Nov. 10, 2005

(65) Prior Publication Data

US 2007/0104162 A1 May 10, 2007

(51) Int. Cl.
*H04J 11/00* (2006.01)
(52) U.S. Cl. ............... 370/208; 370/228; 370/328; 370/335; 370/336
(58) Field of Classification Search ............ 370/328, 370/329, 331, 335, 338, 339, 350, 236, 228, 370/211
See application file for complete search history.

(56) References Cited

U.S. PATENT DOCUMENTS

| | | | | |
|---|---|---|---|---|
| 2005/0220145 | A1* | 10/2005 | Nishibayashi et al. | 370/474 |
| 2005/0226273 | A1* | 10/2005 | Qian | 370/474 |
| 2005/0238016 | A1* | 10/2005 | Nishibayashi et al. | 370/389 |
| 2005/0249183 | A1* | 11/2005 | Danon et al. | 370/347 |
| 2005/0254459 | A1* | 11/2005 | Qian | 370/328 |
| 2005/0265297 | A1* | 12/2005 | Nakajima et al. | 370/338 |
| 2006/0013256 | A1* | 1/2006 | Lee et al. | 370/473 |
| 2006/0083233 | A1* | 4/2006 | Nishibayashi et al. | 370/389 |
| 2006/0087996 | A1* | 4/2006 | Stephens | 370/311 |
| 2006/0140172 | A1* | 6/2006 | Trainin | 370/352 |
| 2007/0047570 | A1* | 3/2007 | Benveniste | 370/448 |

FOREIGN PATENT DOCUMENTS

| TH | 86290 | 8/2007 |
|---|---|---|
| WO | 2007066180 A2 | 6/2007 |

OTHER PUBLICATIONS

"EWC HT MAC Specification", *Enhanced Wireless Consortium publication*, Version V1.0, Copyright 2005, Enhanced Wireless Consortium,(Sep. 12, 2005),35 pages.
"EWC HT PHY Specification", *Enhanced Wireless Consortium publication*, Version V1.01, Copyright 2005 Enhanced Wireless Consortium,(Oct. 7, 2005),42 pages.
"Frame Aggregation for High Efficient MAC", *Mitsubishi Electric Research Laboratories*, (Aug. 5, 2005), 1 page.

(Continued)

*Primary Examiner*—Patrick N Edouard
*Assistant Examiner*—Julio Perez
(74) *Attorney, Agent, or Firm*—Brake Hughes Bellermann LLP (57) ABSTRACT

Various embodiments are disclosed relating to the use of timing or timing-related information for handling aggregated frames in a wireless network. According to an example embodiment, a plurality of frames may be received. An aggregated frame may be generated based on the plurality of received frames. A transmission lifetime for the aggregated frame may be determined based on a transmission lifetime of one or more of the received frames. In another example embodiment, a transmit timer may be determined for the aggregated frame, for example, based on the transmit timer for one or more of the received frames.

25 Claims, 9 Drawing Sheets

OTHER PUBLICATIONS

"Part 11: Wireless LAN Medium Access Control (MAC) and Physical Layer (PHY) specifications: Amendment: Medium Access Control (MAC) Quality of Service (QoS) Enhancements", *IEEE P802.11e/D13.*, (Jan. 2005).

Godfrey, Tim, "Inside 802.11e: Making QoS a Reality over WLAN Connections", http://www.com_msdesign.com/showArticle.jhtml?articleID=17000388, (Dec. 19, 2003),11 pages.

IEEE P802.11 Wireless LANs, "Joint Proposal: High Throughput Extension to the 802.11 Standard: MAC", http://www.ieee802.org/11/DocFiles/05/11-05-1095-05-000n-joint-proposal-mac-specification.doc, section 5.5.4, (Jan. 13, 2006).

International Search Report and Written Opinion for corresponding application #PCT/IB2006/003162, (Nov. 13, 2007).

IEEE 802.11n Draft Specification (Nov. 7, 2005).

* cited by examiner

FIG. 1

Prior Art

USE OF TIMING INFORMATION FOR HANDLING AGGREGATED FRAMES IN A WIRELESS NETWORK

BACKGROUND

The rapid diffusion of Wireless Local Area Network (WLAN) access and the increasing demand for WLAN coverage is driving the installation of a very large number of Access Points (AP). A variety of other wireless networks have been installed, such as cellular and other wireless networks. Some wireless networks are based upon the Institute of Electrical and Electronics Engineers (IEEE) 802.11 family of industry specifications, such as specifications for IEEE 802.11b, IEEE 802.11g and IEEE 802.11a, etc. A number of working groups are working to improve on this technology or family of specifications.

A High Throughput WLAN standard known as IEEE 802.11n has proposed a media access control (MAC) frame aggregation technique to aggregate multiple MAC service data units (MSDUs or MAC data frames). Multiple MAC frames or MSDUs, e.g., having a same destination address, may be aggregated together into a single MSDU (A-MSDU), with additional fields inserted into the resulting aggregated frame. In this manner, additional efficiency may be obtained by eliminating some duplicative overhead for the multiple MSDUs. The Enhanced Wireless Consortium (EWC) has proposed a similar MAC aggregation in the EWC High Throughput (HT) MAC Specification, V1.0, Sep. 12, 2005.

In addition, a draft specification from the IEEE 802.11e Task Group has proposed a set of QoS parameters to be used for traffic delivery between an Access Point (AP) and a station in a wireless network. Under the 802.11e draft specification, different channel access mechanisms are proposed, including a contention based channel access and a polled based channel access. According to the 802.11e draft specification, Enhanced Distributed Channel Access (EDCA), for example, provides a contention based channel access mechanism that differentiates between different traffic classes (Access Categories or AC). According to EDCA, a different set of parameters (such as a contention window size or CW and a minimum period of time to sense an idle medium before transmitting) may be provided for each AC. By using a different set of access and contention parameters for each access category (AC), this may change the probability of obtaining or contending for access to the channel to favor higher priority ACs (traffic classes).

Different types of traffic may have different delay requirements. For example, best-efforts traffic may not have strict delay requirements. However, other types of traffic, such as conversational services (e.g., voice over IP or VoIP) may have stricter delay requirements since frames may typically not be played after their playout or delay time.

The 802.11e draft specification also provides a transmit timer for each MAC frame (or MSDU). A wireless node (e.g., wireless station or access point) may maintain a transmit timer for each received MAC frame or MSDU. A parameter known as MSDULifetime (or Lifetime) may indicate a maximum transmission delay over air interface frame delivery, from wireless node 1 to wireless node 2, for a traffic stream or AC. The transmit timer may be set or started when a frame is received at the MAC. According to the 802.11e draft specification, if the value of the transmit timer for the frame or MSDU exceeds the Lifetime (or delay bound), then the frame is discarded without further attempt to deliver the frame.

However, current proposals do not specify how the frame aggregation mechanisms may relate to or operate with the Lifetime values or with different access categories (ACs).

SUMMARY

Various embodiments are disclosed relating to the use of timing or timing-related information for handling aggregated frames in a wireless network.

According to an example embodiment, a plurality of frames may be received. An aggregated frame may be generated based on the plurality of received frames. A transmission lifetime for the aggregated frame may be determined based on a transmission lifetime of one or more of the received frames. In an example embodiment, the transmission lifetime for the aggregated frame may be determined based on a transmission lifetime of a newest or most recently received frame. In an example embodiment, a plurality of received frames may be aggregated that are directed to the same destination or destination address and/or that are a same access category or traffic class.

In another example embodiment, a plurality of frames may be received. A time-related parameter may be determined for one or more of the received frames. The time-related parameters may each be associated with a transmission lifetime for one of the received frames. An aggregated frame may be generated based on the plurality of received frames. A time-related parameter may be determined for the aggregated frame based on the time-related parameter for one or more of the received frames.

The details of one or more implementations are set forth in the accompanying drawings and the description below. Other features will be apparent from the description and drawings, and from the claims.

DETAILED DESCRIPTION

Figure 1:
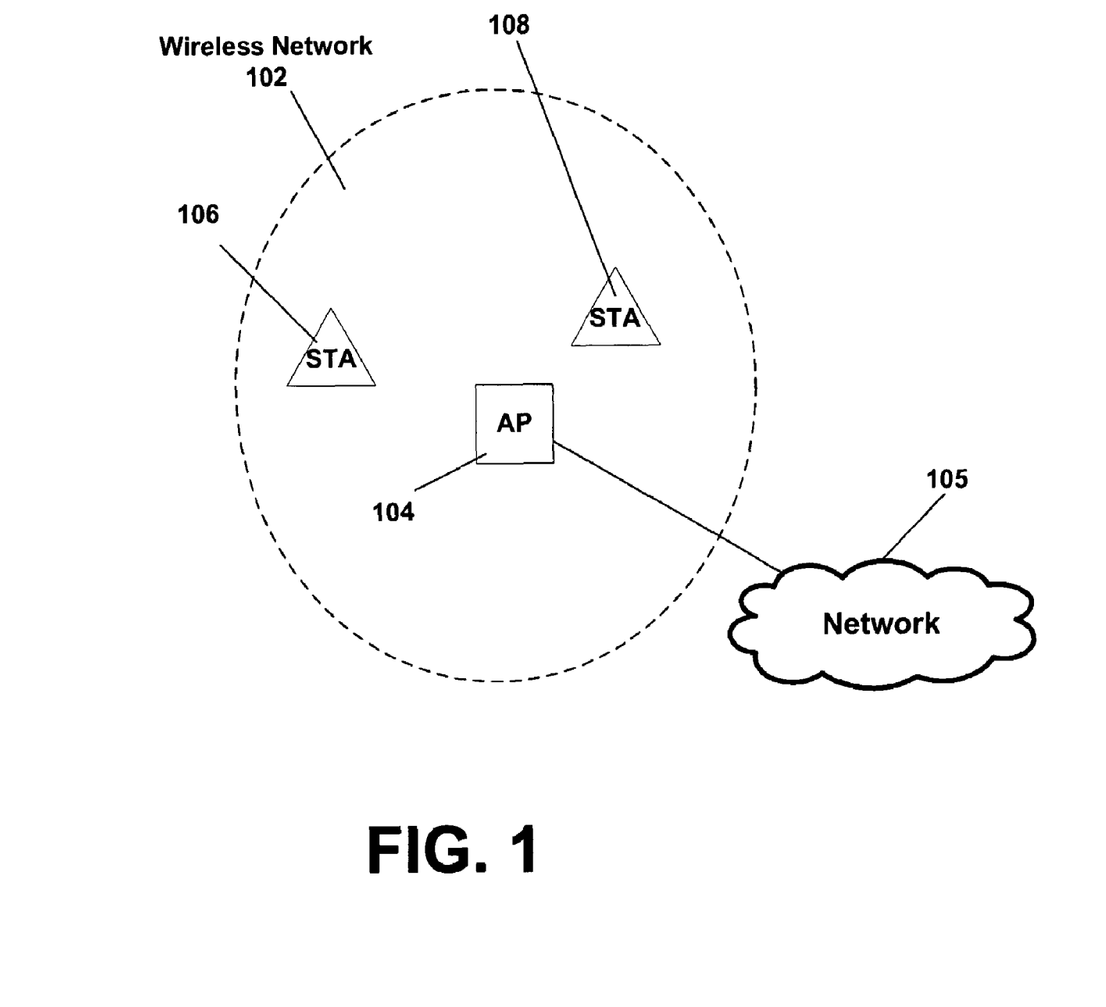
FIG. 1 is a block diagram illustrating a wireless network according to an example embodiment.

Referring to the Figures in which like numerals indicate like elements, FIG. 1 is a block diagram illustrating a wireless network according to an example embodiment. Wireless network 102 may include a number of wireless nodes or stations, such as an access point (AP) 104 or base station and one or more mobile stations, such as stations 106 and 108. While only one AP and two mobile stations are shown in wireless network 102, any number of APs and stations may be provided. Each station in network 102 (e.g., stations 106, 108) may be in wireless communication with the AP 104, and may even be in direct communication with each other. AP 104 may be coupled to a fixed network 105, such as a Local Area Network (LAN), Wide Area Network (WAN), the Internet, etc., and may also be coupled to other wireless networks.

The various embodiments described herein may be applicable to a wide variety of networks and technologies, such as WLAN networks (e.g., IEEE 802.11 type networks), cellular networks, radio networks, or other wireless networks. In another example embodiment, the various examples and embodiments may be applied to a meshed wireless network, where a plurality of mesh points (e.g., Access Points) may be coupled together via wired links. One or more embodiments described herein may be applicable in Ad hoc operation mode, where the stations (106,108) may create a network together and communicate directly without an AP.

Figure 2:
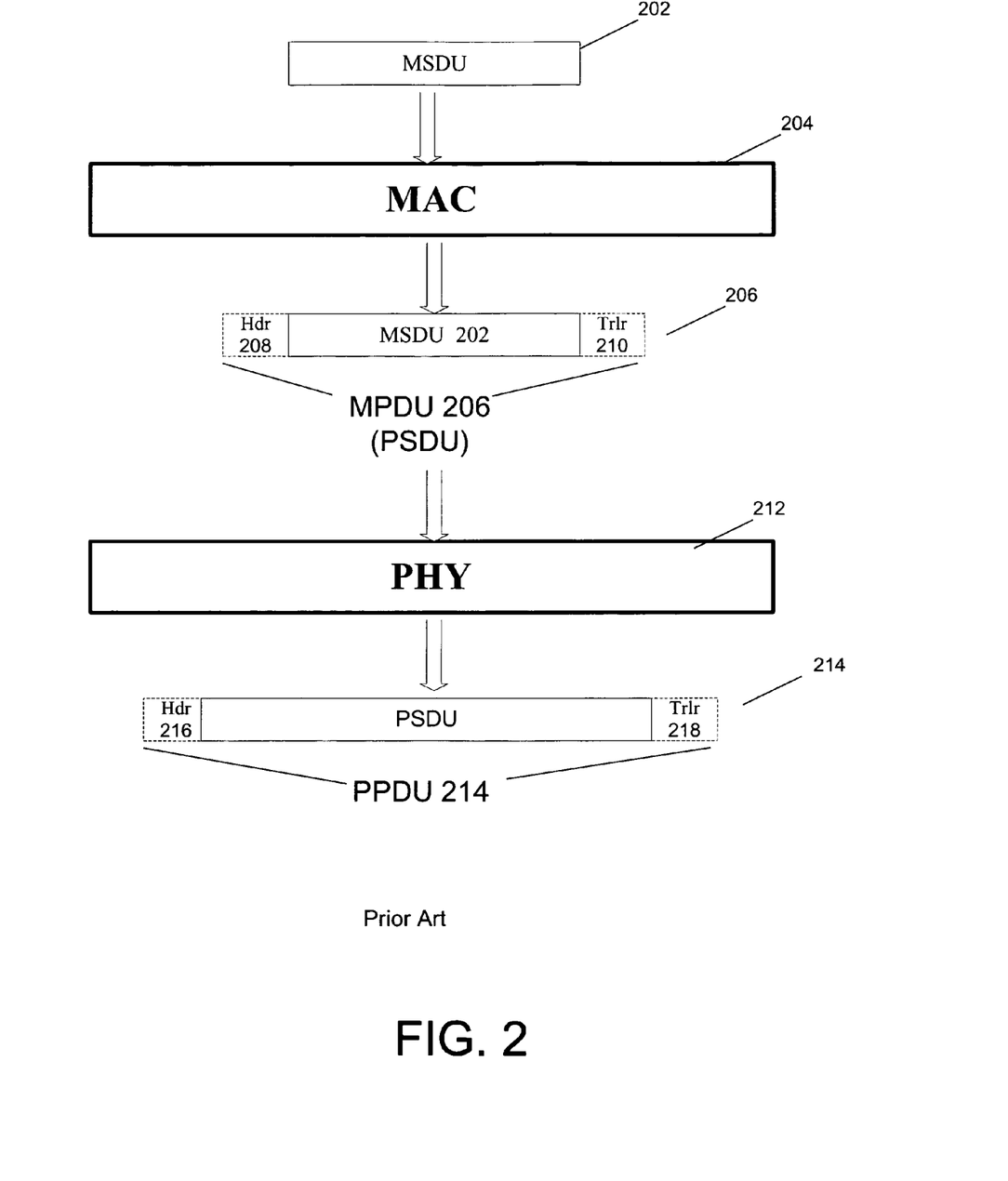
FIG. 2 is a block diagram illustrating a general operation of some layers of a network protocol stack.

FIG. 2 is a block diagram illustrating a general operation of some layers of a network protocol stack. A network protocol stack may, for example, include a number of layers, such as a media access control (MAC) 204 to handle various functions related to control and media access, and a physical layer or PHY 212 which may handle various functions related to transmitting and receiving information over a physical media. A frame, known as a MAC services data unit (MSDU) 202, may be received and processed by MAC 204, including adding a header 208 and/or a trailer 210. The resulting frame (including the MSDU 202, header 208 and trailer 210) may be output by MAC 204 as a MAC protocol data unit (MPDU) 206, and received by PHY 212 as a PHY services data unit (PSDU). Similarly, PHY 212 may process the PSDU and add a PHY layer header 216 and/or a trailer 218 before transmitting the resulting PHY protocol data unit (PPDU) 214 over a media, such as a wireless link. Both headers and trailers are shown for the general case, although there may be some cases or embodiments where a header and/or a trailer may not be present for a frame.

Figure 3:
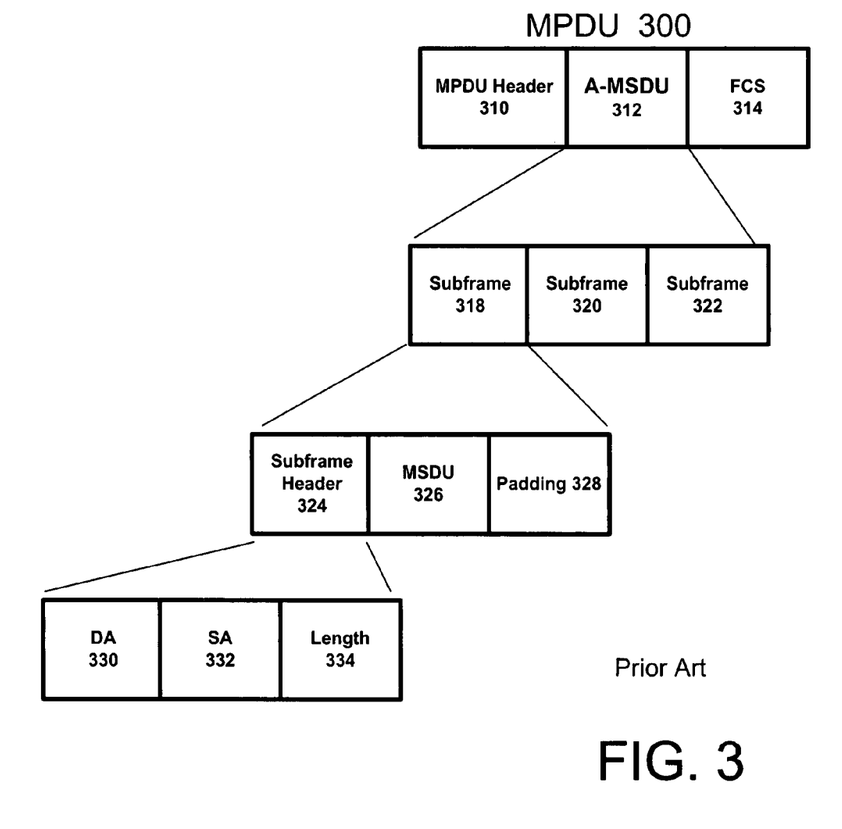
FIG. 3 is a diagram illustrating operation of a frame aggregation.

FIG. 3 is a diagram illustrating operation of a MSDU frame aggregation. A MAC protocol data unit (MPDU) 300 may include a MPDU header 310, which may include various fields, such as frame control, duration/ID, several address fields, sequence control, QoS control, and the like (not shown). MPDU 300 may also include an aggregated MSDU (A-MSDU) 312, which may include several MSDU subframes (such as subframes 318, 320 and 322). MPDU 300 may also include a trailer, such as a frame check sequence (FCS) 314. Each MSDU subframe may include a subframe header 324, a MSDU 326, and padding 328 (e.g., except the last MSDU subframe in the MPDU) which may be used to make subframes each a length of a multiple of 4 bytes, for example. Subframe header 324 may include a destination address (DA) 330, a source address (SA) 332, and a length field 334, for example. FIG. 3 illustrates one example technique in which frames or MSDUs may be aggregated. Other techniques may be used as well.

Figure 4:
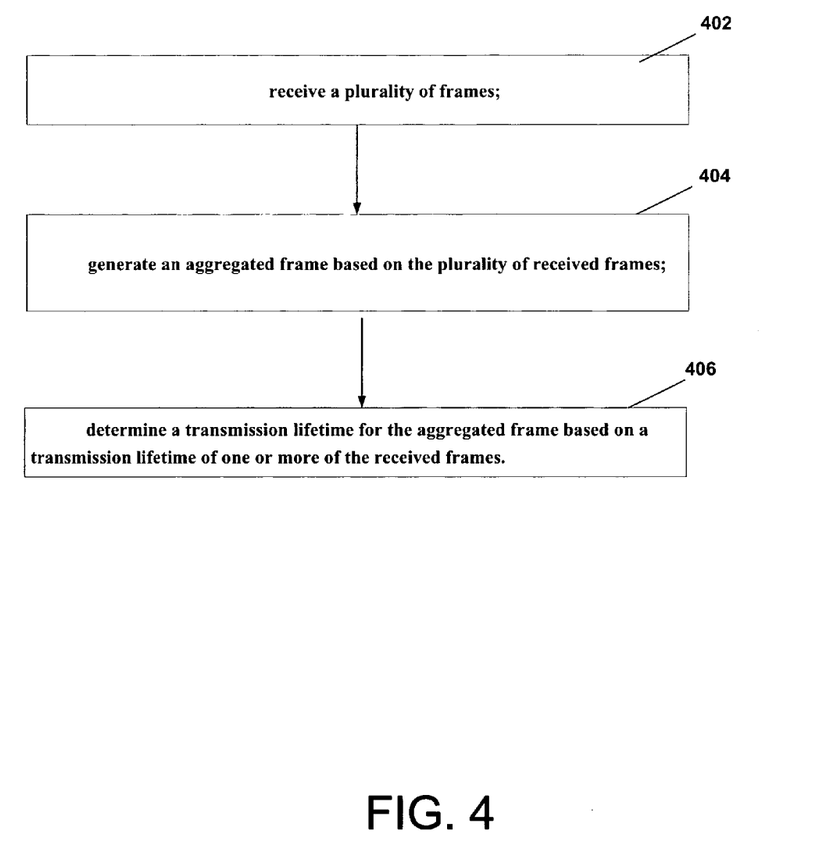
FIG. 4 is a flow chart illustrating operation of frame aggregation according to an example embodiment.

FIG. 4 is a flow chart illustrating operation of frame aggregation according to an example embodiment. At 402, a wireless node (e.g., wireless station or access point or AP) may receive a plurality of frames (e.g., MAC frames or MSDUs). If received at an AP, for example, these frames may be received at an AP from another station to be forwarded to a destination station or may be received at the AP from a network such as the Internet. If received at a station, the frames may be received from an AP or from another station, for example.

At 404, the wireless node may generate an aggregated frame based on the plurality of received frames or MSDUs. For example the wireless node may aggregate a plurality of frames or MSDUs into a single frame or MPDU, where the aggregated frames may be directed or addressed to the same address or destination and/or that are the same access category (AC) or traffic class. If the MSDUs are directed to the same destination or destination address, this may allow the MSDUs to be aggregated or combined in a single MPDU and share a common header (e.g., address and other fields in the MPDU), and thereby reduce overhead. Also, according to an example embodiment, if access categories (AC) or traffic classes are used, frames may be aggregated together if they have the same AC. This may allow nodes to transmit and handle the aggregated frame according to the rules and access parameters for that AC. For example, if all frames aggregated into the aggregated frame are AC3 (e.g., highest access category), then the node may contend for a transmission opportunity (TXOP) according to the access or contention parameters for AC3, which may be more favorable than the access parameters for lower access categories, for example. According to an example embodiment, MSDU frame aggregation may be performed or available (or permitted) only for certain ACs. For example, aggregation may be performed for lower ACs (such as AC0, AC1 and AC2). On the other hand, MSDU frame aggregation may not be performed or permitted for high (or high priority) ACs or traffic classes (e.g., which may have stricter delay requirements), since aggregation may typically involve delaying a transmission of at least some frames until multiple frames have been received.

At 406, the node may determine a transmission lifetime for the aggregated frame based on or according to a transmission lifetime of one or more of the received frames. The aggregated frame may then be transmitted, e.g., before a transmission lifetime for the aggregated frame has expired. There are a number of different ways in which a transmission lifetime for an aggregated frame may be determined.

For example, the transmission lifetime of the aggregated frame may be determined based on a transmission lifetime or a remaining transmission lifetime of a newest or most recently received frame (that is aggregated). MSDULifetime (or Lifetime) may, for example, be specified by an AP or other station for a traffic stream or for an access category (AC). In an example embodiment, a delay bound may be specified by a receiving node, or may be negotiated between two wireless nodes. The delay bound (or MSDULifetime or Lifetime) may, for example, be specified in a Traffic specification (or TSPEC), which may be specified or provided by a wireless node in an Add Traffic Stream Request message or other message.

Three frames of a traffic stream, e.g., frame 1, then frame 2, then frame 3 may be received at the MAC of the node. The receiving node may, for example, start a transmit timer for each MSDU or frame when the MSDU or frame is received at the node's MAC. According to an example embodiment, each MSDU or frame may typically be discarded at the node (e.g., no further attempt to transmit) when the transmit timer for the MSDU or frame exceeds the Lifetime or delay bound for the traffic stream or AC. According to an example embodiment, the transmit timer for the newest or most recently received frame (e.g., frame 3 in this example) may be used as the transmit timer for the aggregated frame. This, for example, may provide a window of time for transmission (or transmission lifetime) for the aggregated frame that is the same or greater than any of the frames (MSDUs) that are aggregated. It may also ensure that the aggregated frame is not discarded (e.g., due to timer exceeding Lifetime for the aggregated frame) before all frames that were aggregated have also exceeded their Lifetimes.

However, other techniques may be used to determine a transmission lifetime for the aggregated frame, such as using the transmit timer for the oldest received and aggregated frame, or an average value of the transmit timers of a plurality (or even all) of the frames that are aggregated, etc. Therefore, as with the individual frames or MSDUs, the aggregated frame (A-MSDU) may, for example, be discarded when the lifetime for the aggregated frame has been exceeded (e.g., transmit timer for the aggregated frame exceeds Lifetime for the traffic stream or AC).

Alternatively, a transmit timer for the aggregated frame may be initialized or started when the aggregated frame is created or aggregated (e.g., started or initialized at the time of aggregation).

Alternatively, a transmission lifetime may be measured using a down-counting timer. For example, each frame's (or MSDU's) transmit timer may be initialized to Lifetime (or delay bound) when the frame is received at the node's MAC, and then may count down. When the transmit timer for a frame reaches zero, the frame may be discarded (e.g., frame may be transmitted until the frames transmit timer reaches zero). Likewise, the transmit timer for the aggregated frame may be initialized to Lifetime (e.g., at the time of aggregation or using the timer value of the newest aggregated frame or other frame) and count down. The aggregated frame may then be discarded when the transmit timer for the aggregated frame reaches zero, for example. Other techniques may be used to determine a transmission lifetime for an aggregated frame.

Figure 5:
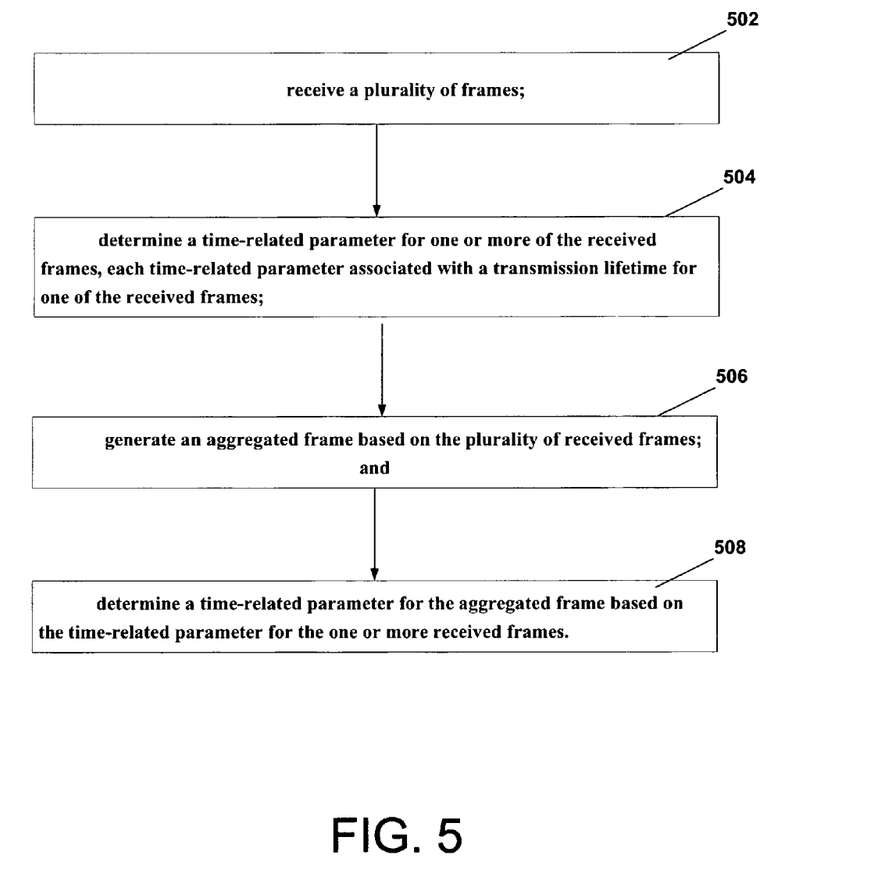
FIG. 5 is a flow chart illustrating operation of frame aggregation according to another example embodiment.

FIG. 5 is a flow chart illustrating operation of frame aggregation according to another example embodiment. At 502, a plurality of frames may be received at a node. At 504, a time-related parameter may be determined for one or more of the received frames. In an example embodiment, each time-related parameter may be associated with a transmission lifetime for one of the received frames. In an example embodiment, a transmit timer may be provided for each frame (or MSDU) and may be started when each frame is received at a node's MAC. The transmit timer may be associated with, or even indicative of, transmission lifetime since, in an example embodiment, the transmission lifetime may expire when the transmit timer exceeds the Lifetime. Lifetime may, for example, be a value indicating a maximum delay (or delay bound) at a node for a frame or traffic stream or AC. At 504, other time-related parameters may be used which may be, in some way, associated with a transmission lifetime of one or more (or each) of the received frames.

At 506, an aggregated frame may be generated based on the plurality of received frames. For example, the plurality of received frames or MSDUs may be aggregated into one frame (A-MSDU) or into one MPDU. Other types of frame aggregation may be performed.

At 508, a time-related parameter for the aggregated frame may be determined based on the time-related parameters for the one or more received frames. According to an example embodiment, a time-related parameter may be determined for the aggregated frame by selecting a time-related parameter of one of the received (and aggregated) frames or MSDUs (this selected time-related parameter may then be used for the aggregated frame). According to another example embodiment, the transmit timer for the newest or most recently received frame may be used as the transmit timer for the aggregated frame. The transmit timer for another frame, such as the oldest frame, or even an average timer value may be used. Other time-related parameters may be used, such as a lifetime timer that may count down, or a transmit timer for the aggregated frame that may be started or initialized when the frames are aggregated, etc.

As noted above, MSDU frame aggregation may be performed in which multiple MSDUs are aggregated to form an A-MSDU. An A-MSDU may be provided within a single MPDU. According to another example embodiment, MPDU frame aggregation may be performed where multiple MPDUs may be aggregated to form an A-MPDU and may be provided in a single PPDU. This may allow multiple MPDUs to be aggregated at the PHY level (in a single PPDU) even where the MPDUs are being sent to different nodes or stations (different destinations).

According to yet another example embodiment, if the transmitted frame is an access category (AC) of AC2 or lower (e.g., AC0, AC1 or AC2), then both types of aggregation mechanisms (A-MSDU and A-MPDU) may be used. The transmission lifetime for the aggregated frame A-MSDU may be set according to the transmission lifetime of the newest frame (newest MSDU), for example. This would allow the aggregated MSDU (A-MSDU) to contain older frames that may extend beyond the delay bound (or Lifetime) specified for the traffic stream or AC. However, for AC3, in an example embodiment, it may be suggested that MSDU aggregation (A-MSDU) not be used since it may allow transmission of MSDUs beyond their delay bound or Lifetime (where their transmission lifetime has expired). However, MPDU aggregation (A-MPDU) may be used for higher ACs, such as AC3, since a transmit timer may be applied for each MSDU for the A-MPDU (e.g., a specific transmission lifetime for each MSDU). The A-MSDU may not be suggested for higher ACs such as AC3 since A-MSDU may provide one transmission lifetime for the aggregated MSDU (one transmission lifetime for all MSDUs in the A-MSDU). The transmission of expired frames should be avoided for higher priority ACs (e.g., to avoid wasting network resources), in one example embodiment. According to an example embodiment, once an aggregated frame has been generated (e.g., aggregating multiple frames or MSDUs), the same node, at least in some cases, may not be able to de-aggregate the aggregated frame to discard a particular MSDU that may have extended beyond its delay bound or Lifetime (e.g., transmission lifetime has expired for that MSDU).

In another example embodiment, stations or APs may provide power management by operating in an automatic power-save delivery (APSD) mode. APSD may, for example, provide two delivery mechanisms: scheduled APSD and unscheduled APSD. Stations may use unscheduled APSD (U-APSD) to have all or some of their frames delivered to them from the AP during unscheduled service periods. An unscheduled service period may begin, for example, when the AP receives a trigger message from the station. According to scheduled APSD (S-APSD), a station may receive a data transmission schedule from an AP indicating a service start time and service interval when the station may receive and transmit frames during scheduled service periods. For example, by using APSD, a station may conserve power and extend battery life by remaining in a lower power state, and then waking during a scheduled or unscheduled service period to receive and transmit data.

Figure 6:
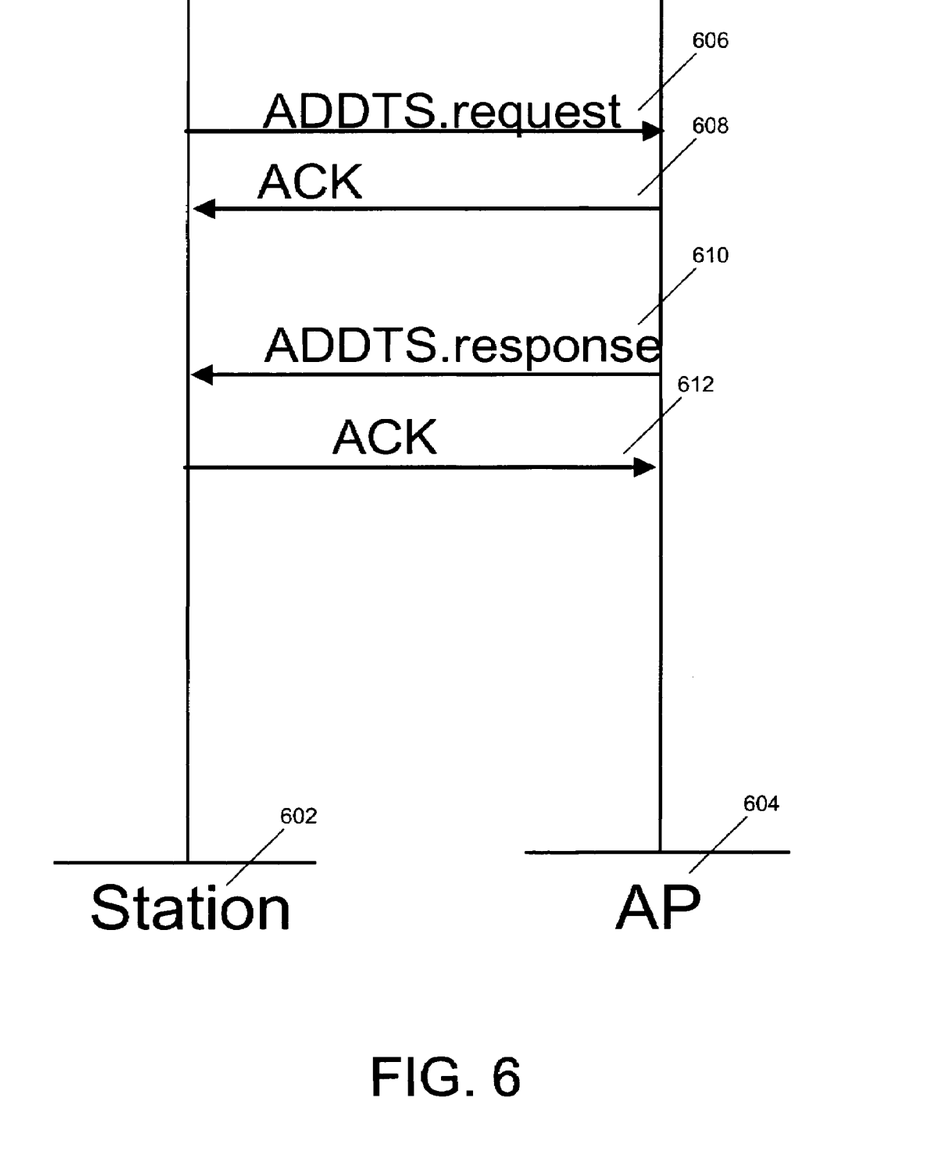
FIG. 6 is a diagram illustrating operation of a wireless station and AP according to an example embodiment.

FIG. 6 is a diagram illustrating operation of a wireless station and AP according to an example embodiment. In the example shown in FIG. 6, a wireless station 602 may be in wireless communication with an AP (access point) 604. Station 602 may be operating in either a U-APSD mode (unscheduled power save delivery mode), a S-APSD mode (scheduled automatic power save delivery mode), or a non power-save mode, as examples, or other mode. Station 602 may send AP 604 an Add traffic stream (AddTS) request (AddTS.Request) 606 requesting the setup of a new traffic stream. As described below, the AddTS request may include some fields describing the traffic stream (such as a delay bound, peak data rate for the traffic stream, etc.) and a user priority or access category (AC) for the traffic stream, request a service or transmission schedule, among other fields. AP 604 may provide an acknowledgement (Ack) 608 to station 602. AP 604 may then provide the requested data transmission schedule via an Add traffic stream (AddTS) response (AddTS.Response) 610. The station 602 may then provide an acknowledgement 612 to AP 604.

Figure 7:
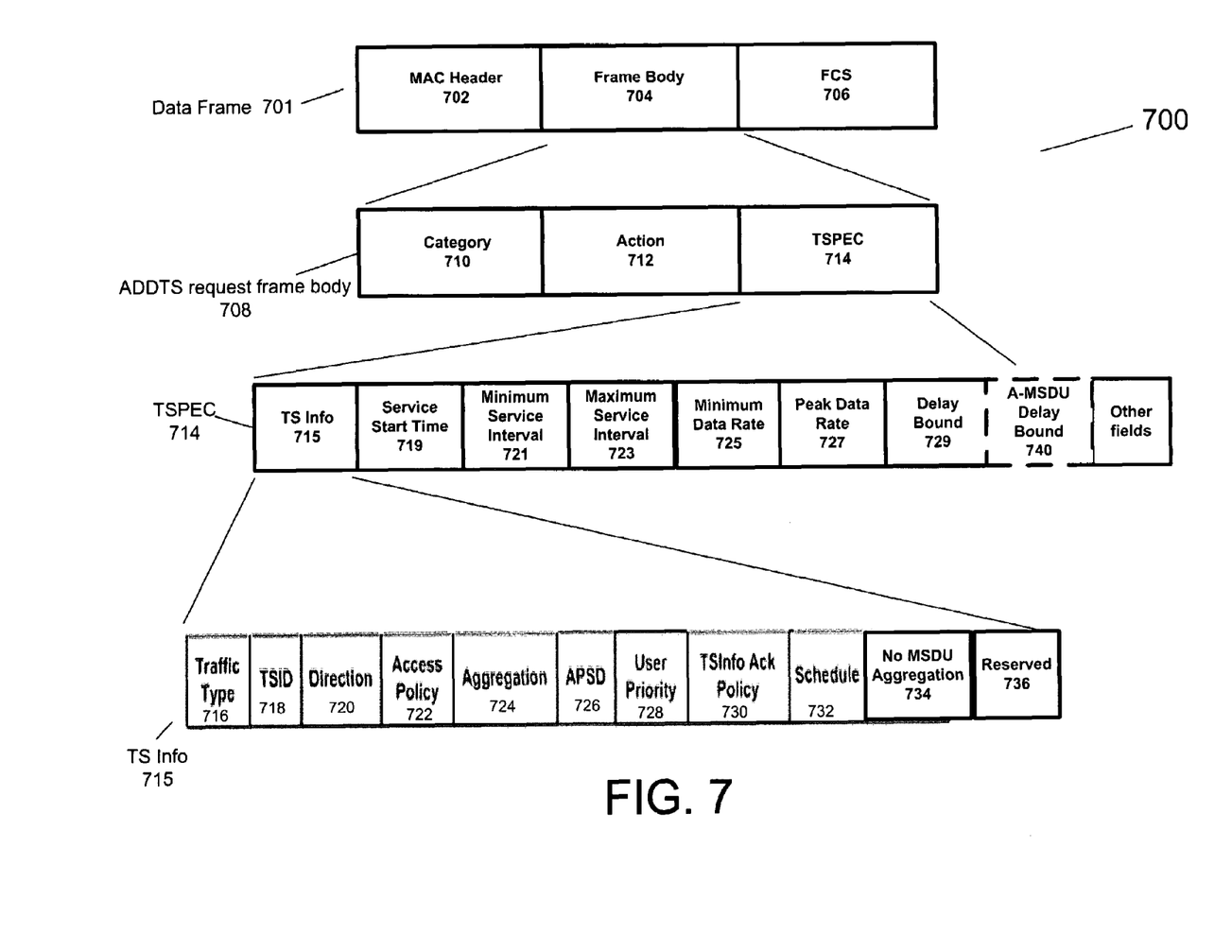
FIG. 7 is a diagram illustrating a format of an Add traffic stream request frame according to an example embodiment.

FIG. 7 is a diagram illustrating a format of an Add traffic stream request frame according to an example embodiment. AddTS request frame 700 may include a MAC header 702 that may include address and other information, a frame body 704 and a frame check sequence (FCS) 706. In an example embodiment, frame body 704 for AddTS request 700 may be an AddTS request frame body 708. The AddTS request frame body 708 may include a category field 710 set to a value indicating QoS (e.g., QoS related frame). An action field 712 may be set to a value indicating AddTS request.

AddTS request frame body 708 may also include a traffic specification or TSPEC 714. TSPEC 714 may include, for example, one or more parameters or values that may describe QoS characteristics of a data flow or traffic stream (or requested traffic stream) to and/or from a station, as well as other information. Some of the example fields that may be provided in an example TSPEC are shown as TSPEC 714 in FIG. 7.

TSPEC 714 may include, for example, a TS Info field 715, which is described in further detail below. TSPEC 714 may also include one or more parameters that may, for example, describe a requested schedule, such as a service start time 719, a minimum service interval 721 and a maximum service interval 723. TSPEC 714 may also include values that may describe QoS characteristics of a data flow or traffic stream (or requested traffic stream), such as minimum data rate 725, peak data rate 727, delay bound 729, etc. Delay bound may specify, for example, a maximum transmission delay over air interface frame delivery. This field may indicate the maximum delay for a frame at a station or AP.

In another embodiment, an A-MSDU delay bound 740 may be provided to allow a station to indicate a maximum delay bound for an aggregated frame (e.g., aggregated MSDU). This may allow a station or AP to specify a different delay bound or Lifetime for an aggregated frame, for example. TSPEC 714 may include other fields.

Referring to a lower portion of FIG. 7, the TS Info field 715 of the TSPEC 714 may include a traffic type 716 which may, for example, indicate a periodic traffic pattern or may indicate an aperiodic or unspecified traffic pattern or other traffic type. A TSID 718 provides a traffic stream ID (identifier), and a direction 720 identifies the direction for the traffic stream (e.g., AP to station, station to AP, station to station, and bidirectional). Access policy 722 may identify the access policy for the traffic stream (e.g., contention-based channel access or EDCA, controlled channel access or HCCA, or mixed, or other policy). Aggregation 724 may be set to 1 to indicate that an aggregate schedule for a station (e.g., indicating an aggregate schedule for multiple or all traffic streams for a station) is being requested (by a station) or set to 1 by an AP when an aggregate schedule is being provided by an AP. APSD 726 may be set to 1 to indicate that automatic power-save delivery (either U-APSD or S-APSD) to be used for traffic associated with the TSPEC, and may be set to 0 otherwise. User priority 728 may indicate the user priority for frames of this traffic stream (e.g., 8 user priorities may map to 4 access categories, including AC0, AC1, AC2 and AC3). TSInfo Ack Policy 730 may indicate an acknowledgement policy to be used (e.g., no acknowledgement, single frame acknowledgement, block acknowledgement). Schedule 732 may indicate whether a schedule is being used or requested for this traffic stream. When the APSD 726 is set to indicate automatic power-save delivery mode, then schedule 732 may be set to 0 to indicate U-APSD and set to 1 to indicate S-APSD, for example.

A No MSDU aggregation field 734 may be provided in the TS info field 715 to allow a station to indicate (or request), when set to 1, that no MSDU aggregation should be used for this traffic stream (and that other types of aggregation such as MPDU aggregation may still be used). When set to 0, this may indicate that MSDU aggregation may be used for this traffic stream. A reserved field 736 is also provided.

Figure 8:
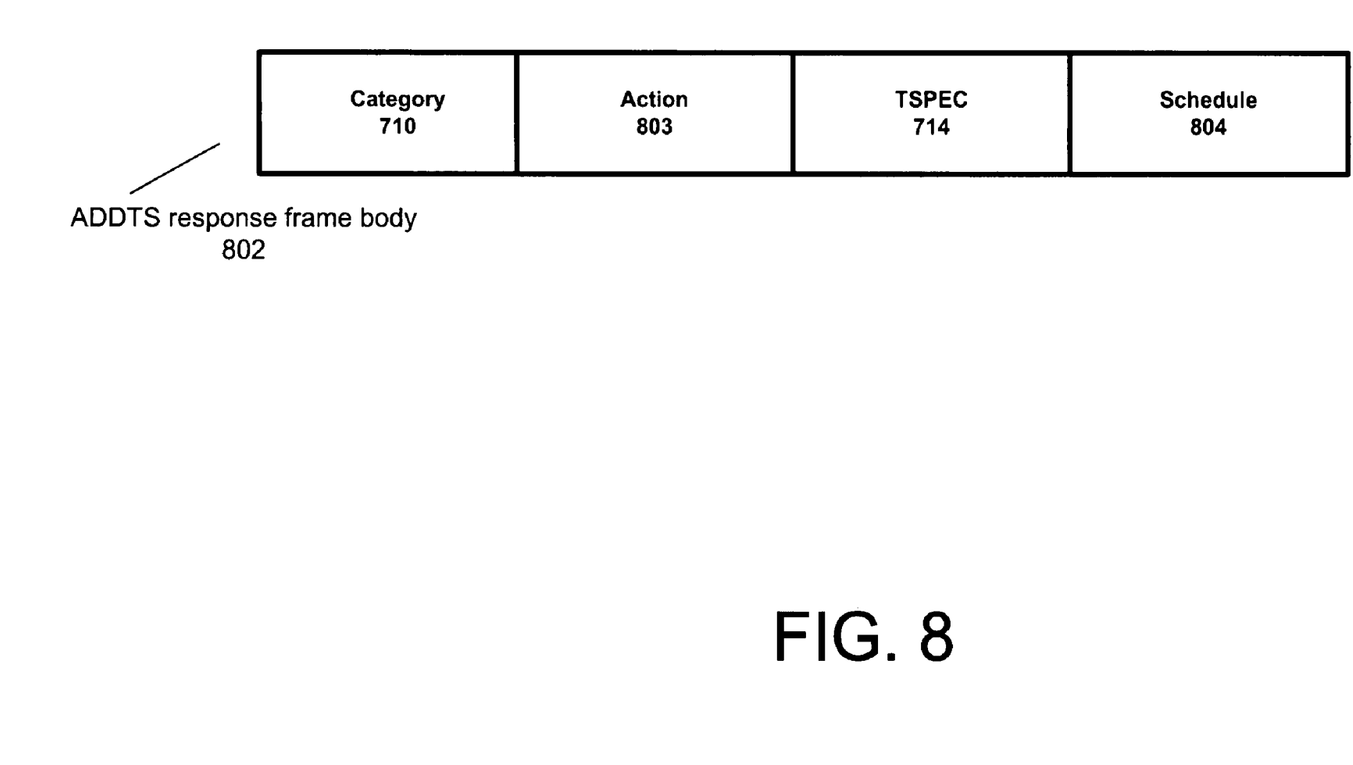
FIG. 8 is a diagram illustrating a format of a frame body for an Add traffic stream (AddTS) response according to an example embodiment.

FIG. 8 is a diagram illustrating a format of a frame body for an Add traffic stream (AddTS) response according to an example embodiment. AddTS response frame body 802 may be provided as the frame body within data frame 701 (FIG. 7), for example. AddTS response frame body 802 may include a number of fields, such as a category 710 (e.g., indicating QoS), action 803 (e.g., indicating AddTS response), a TSPEC 714 (see FIG. 7), and a data transmission schedule 804, which may include a number of fields such as a TSID, a service start time and a service interval, for example.

According to an example embodiment, the MSDU aggregation may be denied for a high AC stream (e.g., AC3) by using the No MSDU Aggregation field 734 in TS-Info element 715 in the TSPEC 714. The TSPEC 714 may be communicated to another node (station or AP) in an AddTS request message and AddTS response message to specify the stream handling specific parameters. According to an example embodiment, MSDU aggregation may not be used, if either the transmitter of the AddTS request or transmitter of the AddTS response have set the No MSDU Aggregation field 734 to 1. Any other aggregation mechanism may be used in such case, according to an example embodiment.

An AC-specific Lifetime for an aggregated MSDU (A-MSDU Lifetime) may be specified for each access category (AC). In addition, for nodes or APs buffering frames to be forwarded to a station that is operating in a power save delivery mode (e.g., U-APSD or S-APSD), a larger AC-specific delay bound or larger A-MSDU Lifetime may be used for such node that buffers frames for power save stations. Thus, the delay from the power save station being in a sleep state may be compensated for by providing a larger A-MSDU Lifetime. This Lifetime compensation technique may also be used for non-aggregated frames, e.g., to increase Lifetime for MSDUs that are to be delivered to a node operating in power save mode.

As noted, AC-specific A-MSDU Lifetime values may be provided. In addition, a node buffering and forwarding frames to a node operating in a power save mode may also employ a (e.g., AC-specific) minimum A-MSDU Lifetime, which may be different than the general AC-specific A-MSDU Lifetime values. The use of such a minimum lifetime for delivery of frames to a power save node may be used to improve or increase the required transmission time of the aggregated frame, e.g., to improve the likelihood such an aggregated frame will be delivered in response to a trigger frame from the power save node that is now awake. The minimum lifetime may be considered a secondary mechanism for lifetime setting and it may be used together with other lifetime setting mechanisms described herein.

Figure 9:
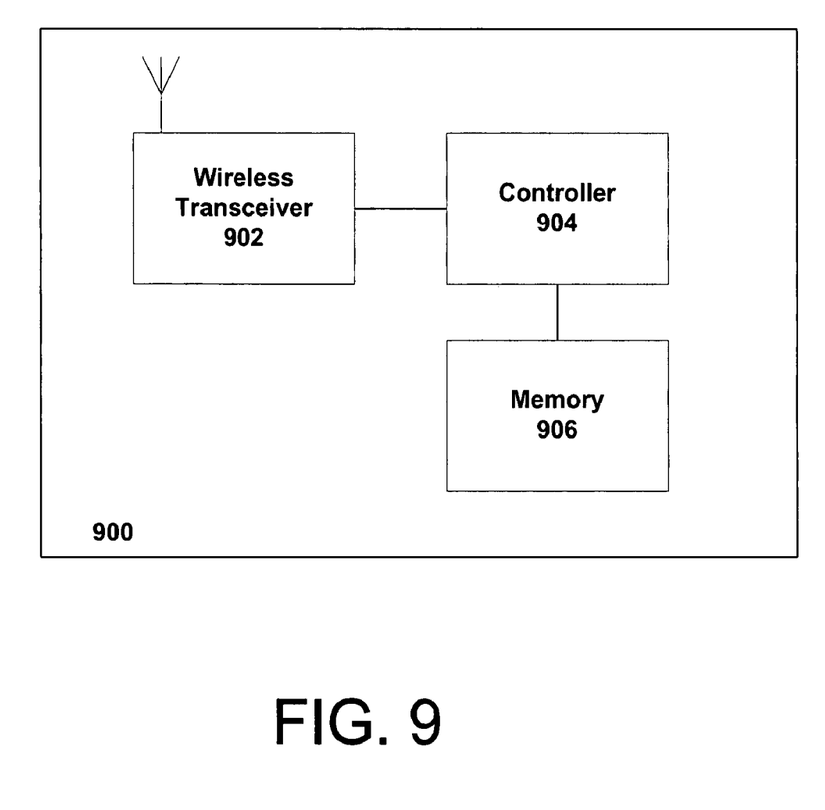
FIG. 9 is a block diagram illustrating an apparatus that may be provided in a wireless station according to an example embodiment.

FIG. 9 is a block diagram illustrating an apparatus 900 that may be provided in a wireless station according to an example embodiment. The wireless station may include, for example, a wireless transceiver 902 to transmit and receive signals, a controller 904 to control operation of the station and execute instructions or software, and a memory 906 to store data and/or instructions. Controller 904 may be programmable, and capable of executing software or other instructions stored in memory or on other computer media to perform the various tasks and functions described above. For example, controller 904 may be programmed to receive a plurality of frames, to generate an aggregated frame based on the plurality of frames, and to determine a transmission lifetime for the aggregated frame based on a transmission lifetime of one or more of the received frames. In addition, a storage medium may be provided that includes stored instructions, when executed by a controller or processor that may result in the controller 904 performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving a plurality of frames;
   generating an aggregated frame based on the plurality of received frames; and
   determining a transmission lifetime for the aggregated frame based on a transmission lifetime of one or more of the received frames,
   wherein a transmission attempt of the aggregated frame is canceled if the transmission attempt is not completed within a time period corresponding with the transmission lifetime for the aggregated frame.

2. The method of claim 1 wherein the generating comprises aggregating a plurality of received frames that are directed to a same destination and that are a same access category or traffic class.

3. The method of claim 1 and further comprising transmitting the aggregated frame within the transmission lifetime for the aggregated frame.

4. The method of claim 1 wherein the determining comprises determining a transmission lifetime for the aggregated frame based on a remaining transmission lifetime of a newest or most recently received frame.

5. The method of claim 1 wherein the determining comprises:
   determining if a destination node for the aggregated frame is operating in a power save mode; and
   determining a transmission lifetime for the aggregated frame based on a transmission lifetime of one or more of the received frames and based on whether or not the destination node for aggregated frame is operating in a power save mode.

6. The method of claim 1 and further comprising discarding the aggregated frame if the aggregated frame is not transmitted within the transmission lifetime for the aggregated frame.

7. A method comprising:
   receiving a plurality of frames;
   determining a time-related parameter for one or more of the received frames, each time-related parameter being respectively associated with a transmission lifetime for one of the received frames;
   generating an aggregated frame based on the plurality of received frames; and
   determining a time-related parameter for the aggregated frame based on the time-related parameters for the one or more received frames,
   wherein a transmission attempt of the aggregated frame is canceled if the transmission attempt is not completed within a time period corresponding with the time-related parameter for the aggregated frame.

8. The method of claim 7 wherein the receiving comprises receiving a plurality of media access control (MAC) frames.

9. The method of claim 7 wherein the receiving comprises receiving a plurality of media access control (MAC) service data units (MSDUs).

10. The method of claim 7 wherein the determining a time-related parameter for one or more of the received frames comprises initializing or starting a transmit timer for one or more of the received frame when the frame is received.

11. The method of claim 7 wherein the determining comprises:
   initializing or starting a transmit timer for each received frame when the frame is received; and
   comparing the transmit timer for each received frame to a frame lifetime.

12. The method of claim 7 wherein said generating comprises generating a aggregated media access control (MAC) frame by aggregating a plurality of received MAC frames.

13. The method of claim 7 wherein the determining a time-related parameter for the aggregated frame comprises selecting a time-related parameter for a newest or most recently received frame.

14. The method of claim 7 wherein the determining a time-related parameter for the aggregated frame comprises selecting a time-related parameter for an access category of the plurality of received frames.

15. The method of claim 7 wherein the determining a time-related parameter for the aggregated frame comprises calculating an average of the time-related parameters for the one or more received frames, the average being selected as the time-related parameter for the aggregated frame.

16. The method of claim 7 and further comprising discarding the aggregated frame if the time-related parameter for the aggregated frame meets a criteria.

17. The method of claim 7 and further comprising discarding the aggregated frame if the time-related parameter for the aggregated frame exceeds a frame lifetime.

18. The method of claim 7, wherein the determining a time-related parameter for each of the received frames comprises initializing or starting a transmit timer for each of the received frames when the frame is received;
   wherein the determining a time-related parameter for the aggregated frame comprises selecting the transmit timer for a newest or most recently received frame; and
   further comprising discarding the aggregated frame if the transmit timer for the aggregated frame exceeds a frame lifetime.

19. An apparatus provided in a station for wireless communication, the apparatus comprising:
   a processor configured to:
      receive a plurality of frames;
      determine a time-related parameter for each of the received frames, each time-related parameter associated with a transmission lifetime for the received frame;
      generate an aggregated frame based on the plurality of received frames; and
      determine a time-related parameter for the aggregated frame based on the time-related parameters for each of the received frames,
      wherein a transmission attempt of the aggregated frame is canceled if the transmission attempt is not completed within a time period corresponding with the determined time-related parameter for the aggregated frame.

20. The apparatus of claim 19 wherein the processor is further configured to:
   determine a time-related parameter for each of the received frames including being configured to initialize or start a transmit timer for each of the received frames when the frame is received;
   determine a time-related parameter for the aggregated frame including being configured to select the transmit timer for a newest or most recently received frame; and
   discard the aggregated frame if the transmit timer for the aggregated frame exceeds a frame lifetime.

21. A computer readable medium having instructions capable of being executed by a processor stored thereon, the instructions, when executed, provide for:
   receiving a plurality of frames;
   determining a time-related parameter for each of the received frames, each time-related parameter associated with a transmission lifetime for the received frame;
   generating an aggregated frame based on the plurality of received frames; and
   determining a time-related parameter for the aggregated frame based on the respective time-related parameters for each of the received frames,
   wherein a transmission attempt of the aggregated frame is canceled if the transmission attempt is not completed within a time period corresponding with the determined time-related parameter for the aggregated frame.

22. The computer readable medium of claim 21 wherein determining a time-related parameter for each of the received frames comprises initializing or starting a transmit timer for each of the received frames,
   wherein determining a time-related parameter for the aggregated frame comprises selecting the transmit timer for a newest or most recently received frame; and
   the instructions, when executed, further provide for discarding the aggregated frame if the transmit timer for the aggregated frame exceeds a frame lifetime.

23. A method comprising:
   receiving a plurality of frames, the plurality of frames having a common access category;
   generating an aggregated frame based on the plurality of received frames; and
   determining a transmission lifetime for the aggregated frame based on the common access category of the plurality of frames,
   wherein a transmission attempt of the aggregated frame is canceled if the transmission attempt is not completed within a time period corresponding with the transmission lifetime for the aggregated frame.

24. The method of claim 23 further comprising:
   initiating a transmit timer for the aggregated frame upon aggregation of the plurality of frames; and
   discarding the aggregated frame if the transmit timer exceeds the transmission lifetime before the aggregated frame is transmitted.

25. The method of claim 23 further comprising; initiating, with the transmission lifetime, a down-counting transmit timer for the aggregated frame; and
   discarding the aggregated frame if the transmit timer expires before the aggregated frame is transmitted.

* * * * *